Jan. 1, 1929.
L. EVANS
1,697,172
SELF RAISING VEHICLE TOP
Filed Jan. 4, 1926
2 Sheets-Sheet 1
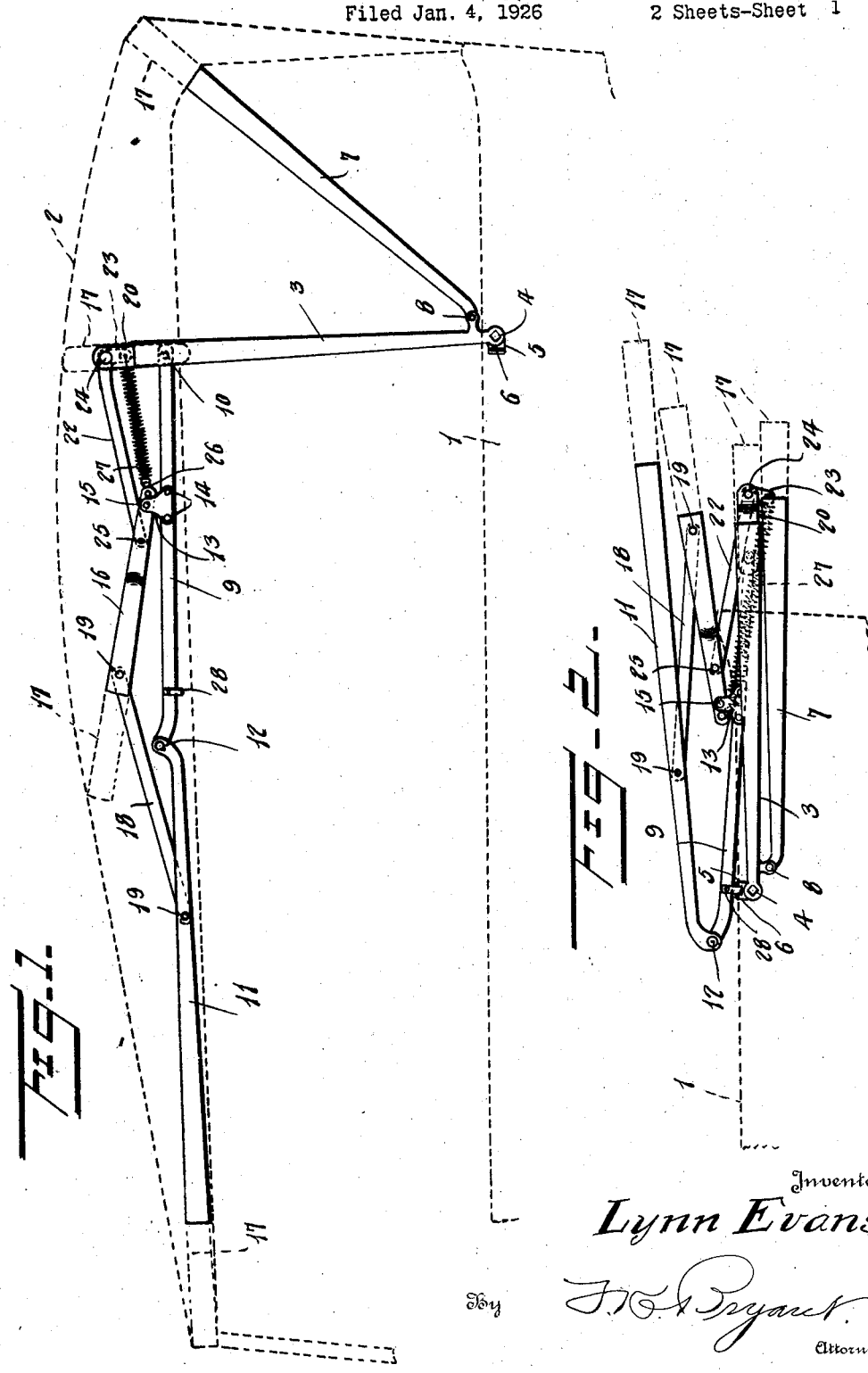
Inventor
*Lynn Evans.*
By *F. W. A. Bryant*
Attorney Jan. 1, 1929.
L. EVANS
1,697,172
SELF RAISING VEHICLE TOP
Filed Jan. 4, 1926
2 Sheets-Sheet 2
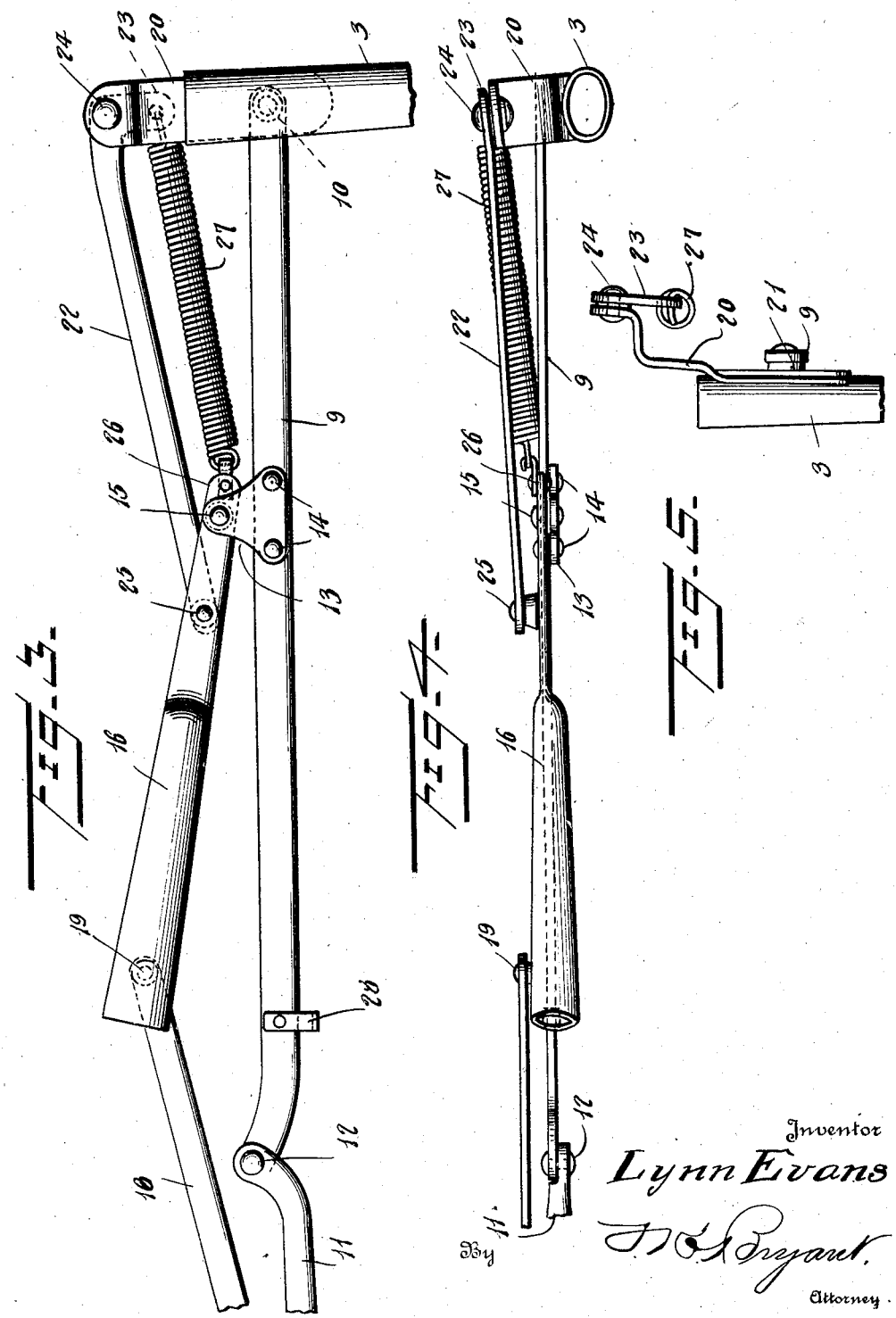
Inventor
Lynn Evans
By
Attorney Patented Jan. 1, 1929.

1,697,172

UNITED STATES PATENT OFFICE.

LYNN EVANS, OF CORTLAND, NEW YORK, ASSIGNOR TO THE BREWER-TITCHENER CORPORATION, OF CORTLAND, NEW YORK, A CORPORATION OF NEW YORK.

SELF-RAISING VEHICLE TOP.

Application filed January 4, 1926. Serial No. 79,159.

This invention relates to certain new and useful improvements in spring bows for automobile tops and has for its primary object to associate a spring with the various bows of an automobile top in such a manner that when the top is released from a folded or retracted position, the same will be automatically projected to its operative or extended position above the open body of the automobile and be retained in the usual manner by the ordinary holding devices.

With the above and other objects in view that will become apparent as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view of an automobile top bow structure with the automobile cover shown in dotted lines, the pivotally mounted superstructure being equipped with the spring device and employing the lever and fulcrum principle for holding the bow elements in their extended operative position, Figure 2 is a side elevational view showing the top elements in folded position, Figure 3 is a fragmentary side elevational view of the rear side of the bow structure showing the spring device associated with a bell crank lever forming a part of the bow construction, Figure 4 is a top plan view of that portion of the bow structure shown in Fig. 3, and Figure 5 is a fragmentary elevational view of a part of one rear bow with the bell crank lever pivoted thereto.

It being understood that the lever and fulcrum principle with the spring attached may be associated with automobile tops of various characters, the present showing is illustrative of a specific embodiment of the invention and in the accompanying drawings, the reference numeral 1 designates an automobile body having a foldable cover 2 supported by a bow structure. The bow structure includes a main bow or hoop provided with complementary legs such as 3 pivotally supported as at 4 upon the respective sides of the automobile body 1 adjacent the rear end thereof as shown in Fig. 1, the pivoted end of each main bow leg 3 may carry at lateral lug 5 provided with an aperture 6 for purposes presently to appear. The rear bow leg 7 may be pivotally attached as at 8 to the main bow leg 3 adjacent the pivoted end thereof and when the top structure is folded, the respective bow legs 3 and 7 occupy positions substantially parallel to each other as shown in Fig. 2. A side rail or outrigger leg 9 is pivoted at its rear end as at 10 to each of the main bow legs 3 and a front bow leg 11 is pivoted as at 12 to the forward end of the respective side rails 9. A bracket plate 13 is secured as at 14 to each of the side rails 9 between the ends thereof as shown in Figs. 1 and 3 and pivoted thereto as at 15, is an intermediate bow leg 16, it being understood that the respective leg portions of the intermediate bow and of the front bow are preferably of tubular construction adapted to receive the cross bows or crown members 17 illustrated by dotted lines so as to constitute an articulated bipartite outrigger bow which is bridged by an intermediary bow in the conventional manner. As shown more clearly in Fig. 1, the intermediate bow leg 16 is connected to the front bow leg 11 by the strut 18 that is pivoted at its opposite ends as at 19 to said parts.

As shown in detail in Fig. 5, an angular offset bracket 20 may be secured as at 21 to the upper end of a main bow leg 3 and a lever preferably of the bell crank type including a relatively long arm or branch 22 and a shorter arm or branch 23 is pivotally supported as at 24 upon the upper end of the bracket 20. The longer arm 22 of the bifurcated lever is here shown as forwardly directed with the front end thereof pivotally connected as at 25 to an intermediate bow leg 16 at a point spaced forwardly of the pivotal mounting 15 of said intermediate bow leg. As shown more clearly in Fig. 3, the rearward end of the bow leg 16 extends inwardly of the pivot point 15 as at 26 and a coil spring 27 is secured at its opposite ends to the extension 26 of the intermediate bow leg and the lower end of the depending shorter arm 23 of the bell crank lever.

Assuming the top bow construction to be in its extended operative position as shown in Figs. 1 and 3 and it being desired to fold the top, it being understood that tension on the spring 27 is relieved when the top bow construction is extended, then the complementary knuckle joint 12 between the side rail 9 and the front bow 11 is broken downwardly whereupon the side rail 9 moves upon its pivotal mounting 10 toward the main bow leg 3. During this movement, the intermediate bow leg 16 moves upon its pivotal mounting 15 on the bracket 13 carried by the side rail 9 and the pivoted end 25 of the lever arm 22 moves in an arcuate path downwardly toward the main bow leg 3. The shorter arm 23 of the bifurcated lever is moved in a direction away from the pivot point 15 of the intermediate bow leg 16 and the extension 26 upon said bow leg 16 moves in a direction away from the lever pivot point 24. These relative movements cause the spring 27 to be extended and placed under tension, the maximum tension being obtained when the various bows assume their folded positions shown in Fig. 2, and when so relatively disposed, the hook or tie means 28 carried by the side rail 9 is engaged in the opening 6 of the lug 5 at the lower end of the main bow 3 to retain the top structure in its folded position. The spring 27 being thereby held under tension when the top bow structure is folded, power stored therein is employed for automatically extending the top bow structure when the hook 28 is released from the keeper lug 5, the tension of the spring returning the top structure into its extended position shown in Figs. 1 and 3. The spring when placed under tension exerts a pull upon the shorter lever arm 23 and upon the extension 26 of the intermediate bow leg 16 which causes the arm 22 of the bifurcated lever to extend the top structure as a whole, this movement being communicated to the front bow leg 11 through the medium of the strut connection 18. It is emphasized that the disposition given the coiled resilient means is such as to maintain the axis thereof in a substantially straight-line relation during both the raising and folding of my top structure.

Although a specific embodiment and style of top structure have been herein disclosed in connection with my self-raising top device, it will be understood that various changes in detail or arrangement thereof may be resorted to, all without departing from the spirit and scope of my invention, hereto described and more particularly pointed out in the appended claims.

What is claimed is:—

1. In a collapsible top structure of the self-raising type for vehicle bodies, the combination of a bipartite outrigger bow, a main bow pivotally adjoined to the respective legs of said outrigger bow and adapted in raised position to support the last named bow with respect to the body, an intermediate bow pivotally mounted upon the outrigger bow, a lever fulcrumed between its ends upon said main bow and of which lever one end portion is pivotally adjoined to the intermediate bow, and resilient means connecting the last named bow with the other end portion of said lever, said means to be placed under tension when the top is folded for automatically extending the top.

2. In a collapsible top structure of the self-raising type for vehicle bodies, the combination of a bipartite outrigger bow, a main bow pivotally adjoined to the respective legs of said outrigger bow and adapted in raised position to support the last named bow with respect to the body, an intermediate bow having legs pivotally mounted upon the respective outrigger bow legs and provided with a member extending beyond one of such pivotal leg mountings, a bifurcated lever fulcrumed between its ends upon said main bow and of which lever one branch is pivoted to an intermediate bow leg in spaced relation to said one pivoted mounting and opposite the extension member, and resilient means stretched between said extension member and the other branch of said lever, said means to be placed under augmented tension whenever the top is folded for subsequently urging said top into raised position.

3. In a collapsible top structure of the self-raising type for vehicle bodies, the combination of a bipartite outrigger bow, a main bow pivotally adjoined to the respective legs of said outrigger bow and adapted when raised to support the last named bow with respect to the body, and intermediate bow pivotally mounted upon said outrigger bow, a bifurcated lever comprising arms of which in raised top position one arm is forwardly directed and the other arm is depending therefrom, said lever being fulcrumed upon said main bow while the forwardly directed arm is pivotally adjoined to the intermediate bow, and resilient means connecting the last named bow with said depending arm of the lever, said means being stretched when the top is folded and serving to automatically raise the top.

4. In a collapsible top structure of the self-raising type for vehicle bodies, the combination of a bipartite outrigger bow, a main bow pivotally adjoined to the respective legs of said outrigger bow and adapted in raised position to support the last named bow with respect to the body, an intermediate bow pivotally mounted upon the outrigger bow, a lever fulcrumed between its ends upon said main bow and of which lever one end portion is pivotally adjoined to the intermediate bow, resilient means connecting to last named bow with the other end portion of said lever, said means to be placed under tension when the top is folded for automatically extending the top, and retaining means serving to releasably hold said spring under tension while the top is folded.

5. In a collapsible top structure for vehicle bodies adapted to be automatically shifted between folded and raised positions, the combination of a bipartite outrigger bow, a main bow pivotally adjoined to the respective legs of said outrigger bow and adapted in raised position to support the last named bow with respect to the body, an intermediate bow having legs pivotally mounted upon the respective outrigger bow legs, strut means pivotally interconnecting the outrigger bow with the intermediate bow, a bifurcated lever fulcrumed between its ends upon said main bow and of which lever one branch is pivoted to one leg of the intermediate bow, and resilient means stretched between said one leg of the intermediate bow and the end portion of the other lever branch, said means to be placed under tension when the top is folded for automatically extending its structure.

6. In a collapsible top structure of the self-raising type for vehicle bodies adapted to be automatically shifted between folded and raised positions, the combination of a bipartite outrigger bow, a main bow pivotally adjoined to the respective legs of the outrigger bow and adapted in raised position to support the last named bow with respect to the body, an intermediate bow having legs pivotally mounted upon the respective outrigger bow legs, strut means pivotally interconnecting the outrigger bow with the intermediate bow, a bifurcated lever fulcrumed between its ends upon said main bow and of which lever one branch is pivoted to one leg of the intermediate bow, and resilient means of the coiled spring type stretched between said one leg of the intermediate bow and the end portion of the other lever branch, the coils of said spring means being maintained in a substantially rectilinear stretched relation while the top is being folded.

In testimony whereof I affix my signature.

LYNN EVANS.